(12) United States Patent
Harnik et al.

(10) Patent No.: US 8,650,163 B1
(45) Date of Patent: Feb. 11, 2014

(54) ESTIMATION OF DATA REDUCTION RATE IN A DATA STORAGE SYSTEM

(75) Inventors: Danny Harnik, Tel-Mond (IL); Oded Margalit, Ramat Gan (IL); Dalit Naor, Tel Aviv (IL); Dmitry Sotnikov, Givataim (IL); Gil Vernik, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/589,197

(22) Filed: Aug. 20, 2012

(51) Int. Cl.
*G06F 17/30* (2006.01)
(52) U.S. Cl.
USPC .......................................................... 707/692
(58) Field of Classification Search
USPC ....... 707/2, 3, 692; 702/189; 711/111; 704/2; 709/204–206
See application file for complete search history.

(56) References Cited

U.S. PATENT DOCUMENTS

| | | | | |
|---|---|---|---|---|
| 6,345,244 | B1 * | 2/2002 | Clark ................................. | 704/2 |
| 2008/0059125 | A1 * | 3/2008 | Fraser et al. ................... | 702/189 |
| 2010/0281081 | A1 | 11/2010 | Stager et al. | |
| 2012/0036319 | A1 * | 2/2012 | Bondurant ..................... | 711/111 |

OTHER PUBLICATIONS

Alon et al., "The space complexity of approximating the frequency moments", Journal of Computer and System Sciences, 58(1), pp. 137-147, 1999.
Bar-Yossef et al., "Counting distinct elements in a data stream". Computer Science, Randomization and Approximation Techniques in Computer Science, Lecture Notes in Computer Science, pp. 1-10, 2002.
Charikar et al., "Towards estimation error guarantees for distinct values", Proceeding PODS '00 Proceedings of the nineteenth ACM SIGMOD-SIGART-SIGART symposium on Principles of database systems, pp. 268-279, 2000.
Constantinescu and Lu, "Quick estimation of data compression and de-duplication for large storage systems", 2011 First International Conference on Data Compression, Communications and Processing (CCP), pp. 98-102, Jun. 2011.
Debnath et al., "Chunkstash: speeding up inline storage deduplication using flash memory", Proceedings of the 2010 USENIX conference on USENIX annual technical conference, pp. 16-16, 2010.
Flajolet and Martin, "Probabilistic counting algorithms for data base applications", Journal of Computer and System Sciences, vol. 31, Issue 2, pp. 182-209, Oct. 1985.
Phillip B. Gibbons, "Distinct sampling for highly accurate answers to distinct values queries and event reports". Proceedings of the 27th VLDB Conference, Roma, Italy, pp. 541-550, 2001.

(Continued)

*Primary Examiner* — Etienne Leroux
(74) *Attorney, Agent, or Firm* — F. Jason Far-hadin, Esq.; Century IP Group (57) ABSTRACT

Systems and methods for estimating data reduction ratio for a data set is provided. The method comprises selecting a plurality of m elements from a data set comprising a plurality of N elements; associating an identifier $h_i$ for each of the plurality of m elements; associating an identifier $h_e$ for each of the plurality of elements in the data set; tracking number of times an element i appears in a base set that includes the plurality of m elements selected from the data set; calculating a value $count_i$ that indicates the number of times an identifier $h_e$ matches an identifier $h_i$; and estimating data reduction ratio for the plurality of N elements in the data set, based on number of m number elements selected from the data set and the value $count_i$.

17 Claims, 5 Drawing Sheets

(56) References Cited

OTHER PUBLICATIONS

Phillip B. Gibbons, "Distinct-values estimation over data streams". In Data Stream Management: Processing High-Speed Data, 2009.

Gibbons and Tirthapura, "Estimating simple functions on the union of data streams", SPAA '01 Proceedings of the thirteenth annual ACM symposium on Parallel algorithms and architectures, pp. 281-291, 2001.

Kane et al., "An optimal algorithm for the distinct elements problem", PODS '10 Proceedings of the twenty-ninth ACM SIGMOD-SIGACT-SIGART symposium on Principles of database systems, pp. 41-52, 2010.

Lillibridge et al., Sparse indexing: Large scale, inline deduplication using sampling and locality. FAST '09 Procceedings of the 7th conference on File and storage technologies, pp. 111-123, 2009.

Raskhodnikova et al., "Strong lower bounds for approximating distribution support size and the distinct elements problem".48th Annual IEEE Symposium on Foundations of Computer Science, pp. 813-842, 2007.

Zhu et al., "Avoiding the disk bottleneck in the data domain deduplication file system". Fast'08 Proceedings of the 6th USENIX Conference on File and Storage Technologies, Article No. 18, 2008.

Constantinescu et al, Mixing deduplication and compression on active data sets', Data Compression Conference (DCC), pp. 393-402, 2011.

Meyer and Bolosky, "A study of practical deduplication".ACM Transactions on Storage (TOS) TOS Homepage archive vol. 7 Issue 4, Article No. 14, Jan. 2012.

* cited by examiner

ESTIMATION OF DATA REDUCTION RATE IN A DATA STORAGE SYSTEM

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to estimating data reduction rate and, more particularly, to a system and method for estimating data deduplication and compression ratios for a data set prior to reducing the size of the data set.

BACKGROUND

Database and data storage systems typically store duplicate copies of the same data across data storage media connected to a data network. For example, consider a large data file that has been distributed to multiple email recipients over an email server in an enterprise network. Multiple copies of the same large file may reside on the email server or across various storage media in the network.

Data deduplication schemes are available that can help remove the duplicate copies and improve the overall network storage space. In large data storage systems, performing deduplication can take a very long time and may also require the utilization of a considerable amount of system resources. As such, there is a time and resources cost associated with deduplicating a large set of data.

To evaluate the cost of deduplication against its benefits, one naïve approach would be to simply apply a data reduction technique to the entire data set and then determine the data reduction rate achieved as the result. Since this approach can be prohibitively expensive in terms of processing time, processing power and memory consumption, it would be desirable to know in advance what the benefits are in terms of data storage.

Currently, a general estimation of the achieved benefits may be calculated based on empirical studies performed on application of different data reduction techniques to various sizes or types of data. This estimation technique is typically inaccurate when dealing with unique data workloads or a specific type of use. Efficient systems and methods that can provide more accurate estimates are desirable.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, a method for estimating data reduction ratio for a data set is provided. The method comprises selecting a plurality of m elements from a data set comprising a plurality of N elements; associating an identifier $h_i$ for each of the plurality of m elements; associating an identifier $h_e$ for each of the plurality of elements in the data set; tracking number of times an element i appears in a base set that includes the plurality of m elements selected from the data set; calculating a value $count_i$ that indicates the number of times an identifier $h_e$ matches an identifier $h_i$; and estimating data reduction ratio for the plurality of N elements in the data set, based on number of m number elements selected from the data set and the value $count_i$.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
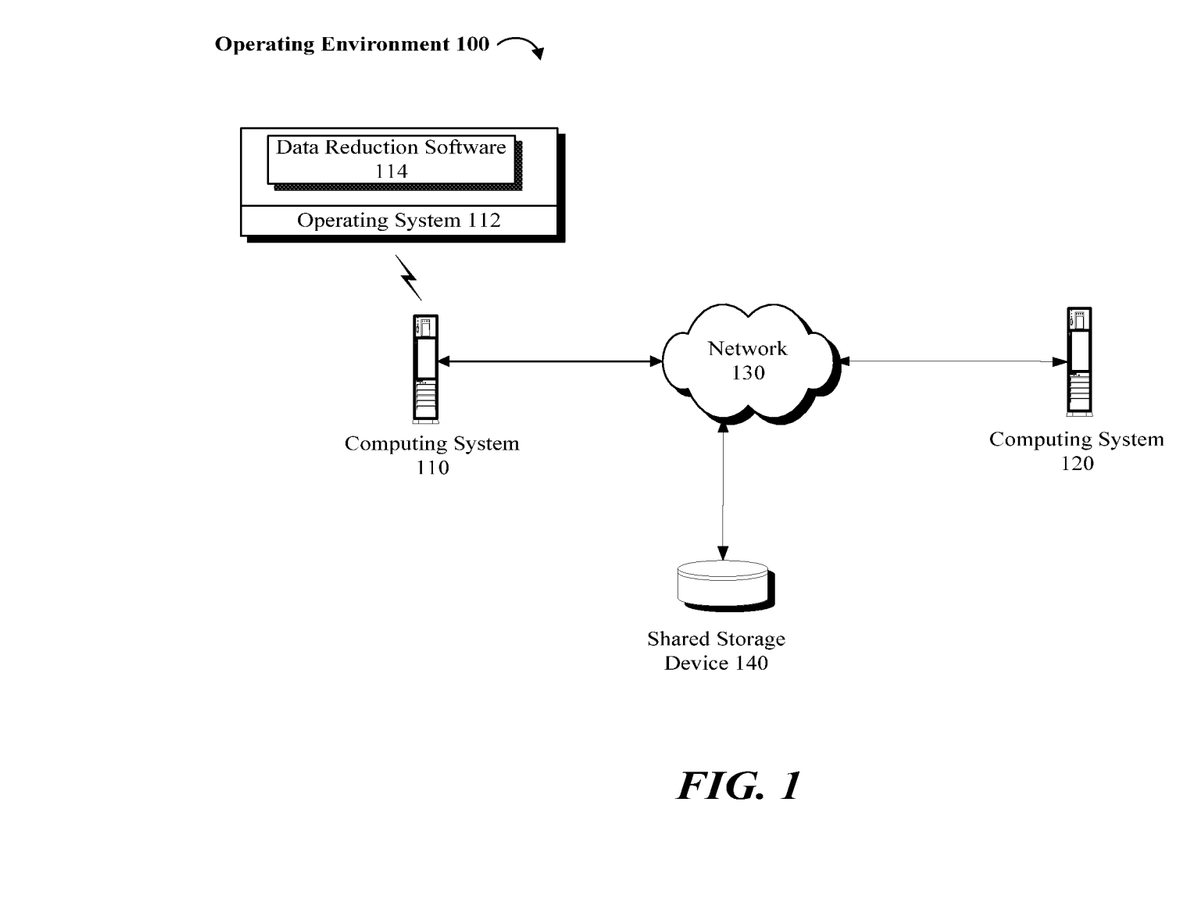
FIG. 1 is a diagram of an exemplary operating environment that supports data deduplication in accordance with one embodiment.

Referring to FIG. 1, an exemplary operating environment 100 is illustrated in which data reduction software 114 is executed over an operating system 112 loaded on a computing system 110. In accordance with one aspect, operating environment 100 may support a multiprocessing networked environment in which computing system 110 is connected to one or more computing system(s) 120 and shared storage device 140 over network 130.

In accordance with on embodiment, data reduction software 114 may be utilized to deduplicate, compress or otherwise compact data stored on shared storage device 140 or other data storage devices connected to network 130. In contrast to conventional methods, in one embodiment, the efficiency of applying the data reduction techniques to a target data set is calculated, prior to performing data reduction on the entire data set, as provided in further detail below.

Figure 2:
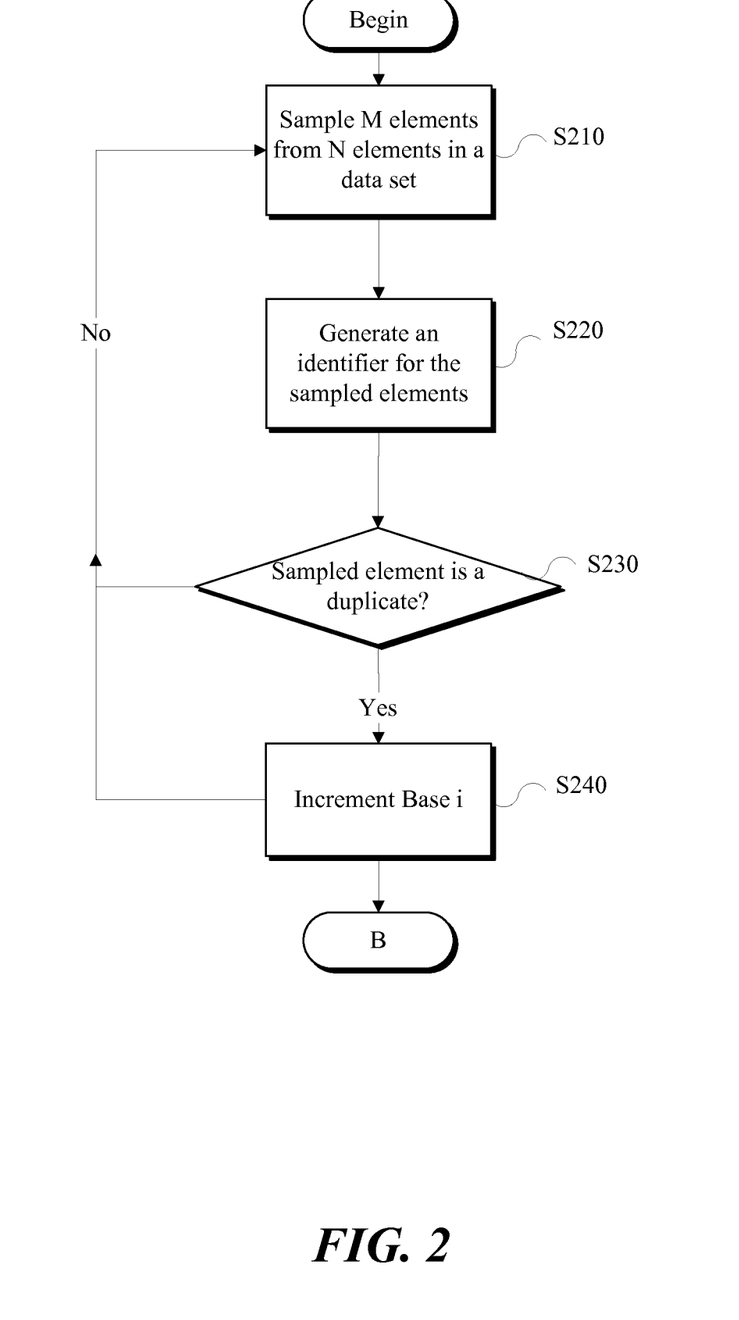
FIG. 2 is a flow diagram of a method of sampling a data set in accordance with one embodiment.

Referring to FIG. 2, in one exemplary implementation, a two phase approach may be utilized. In the first phase (i.e., the sampling phase), a data set (S) is sampled to select M elements out of a total of N elements in S to create a base sample (B) (S210). The sampling may be performed randomly or according to a sampling algorithm. In one example, a unique or semi-unique identifier is generated for a sampled element (S220). For example, the unique identifier may be generated by applying a hash algorithm to a value obtained from a file name associated with the sampled element.

The identifier is stored in a data structure (e.g., a hash table). It is noteworthy that two or more elements out of the N elements in S may be duplicate copies and thus applying a uniform method to generate an identifier for one sampled element optionally would lead to generating the same identifier for another element, when the two elements are duplicates. Using this methodology, or other methods, sampled elements that are duplicates may be identified (S230). In the sampling phase, each time a duplicate sample element is encountered in S, a first counter (e.g., Base i) associated with that sample element is incremented to keep track of how many times the same element is represented in B (S240).

Once the sampling phase is completed, the data structure includes information about the number of duplicates for the elements included in the base sample B. In one embodiment, the compression rate of the sample element added to B is calculated and is stored in association with the identifier for that element. Depending on implementation, the compression rate may be determined by applying a compression algorithm to the element and comparing the size of the compressed version to the size of the non-compressed version. It should be noted that the compression rate calculation is an optional process that may or may not be applied, depending on implementation.

Figure 3:
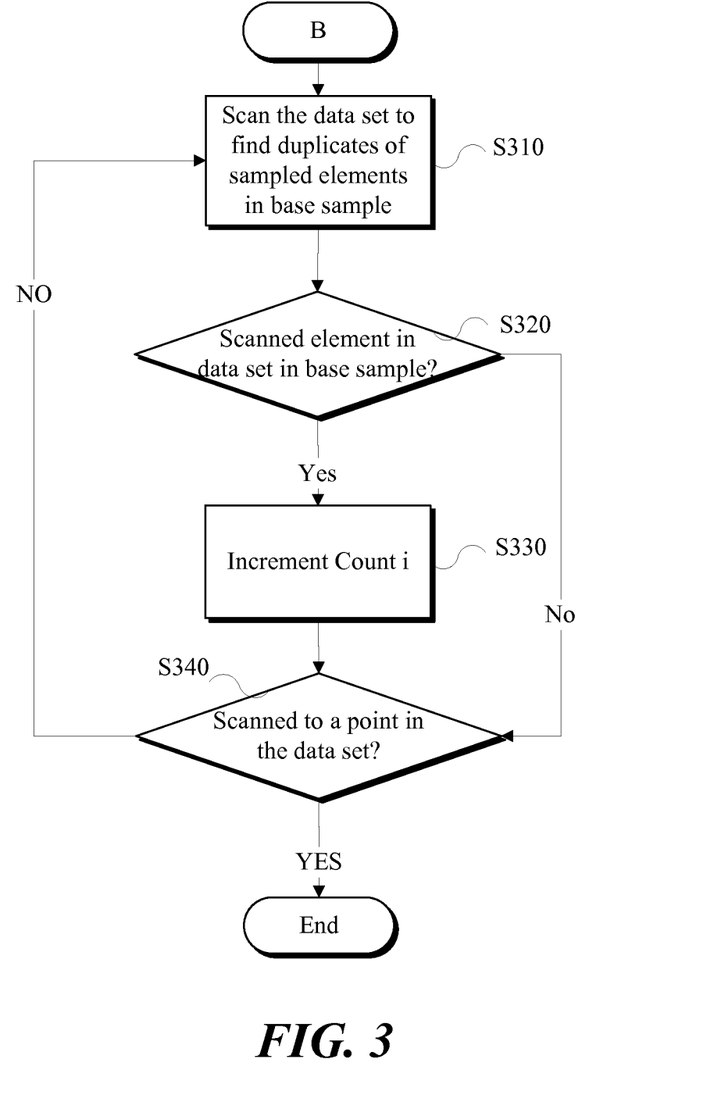
FIG. 3 is flow diagram of a method of scanning the data set for duplicates in accordance with one embodiment.

Referring to FIG. 3, in the second phase (i.e., the scanning phase), the data set S is scanned to find duplicates of the sampled elements in B (i.e., to determine for each element in S whether an element in S is found in B) (S310). Each time an element in S is found in B, then a second counter (Count i) is incremented for that element in B (S320-S330). The scanning continues until the elements in S are scanned to a predetermined point (e.g., the end) in the data set (S340). In one embodiment, Count(i) indicates the number of times hash value of each element in data set S matches the hash value of an element (i) in sample B, for example. As such, once the scanning of the data set S is completed, a counter for each element in B is calculated that reflects the number of times a particular element in B appears in S.

In accordance with one embodiment, the data reduction rate (e.g., deduplication and compression rate) for the elements in B may be calculated by:

$$Est = \frac{1}{m}\sum_{i \in B} \frac{\text{base}_i \cdot \rho_i}{\text{count}_i}$$

where:
Base i=first counter for the elements in the base sample
Count i=second counter for the elements in the actual target set
$\rho_i$=standard compression ratio for an element in the base
M=number of elements in the base sample (inclusive of the duplicate elements)

Since the elements in B are a representative of the entire data set S, the obtained results may be used to determine a relatively accurate deduplication rate estimate based on the actual data included in the data set S for the deduplication and compression ratio that may be achieved from deduplicating and compressing the elements in S. It is noteworthy that, depending on implementation, different sampling algorithms may be used in the sampling phase. However, for better accuracy in estimation, one may take into account the type of deduplication (e.g., fixed-size v. variable-size) and introduce biases into the sampling phase so that the elements introduced in the base sample B provide a better representation for the actual elements in the data set S.

For example, consider a deduplication scenario in which fixed-size elements (e.g., fixed data chunks in a file) are used for the purpose of finding a duplicate. This scheme is generally referred to as "chunk level deduplication." In such a scenario, sampling is performed so that for larger files in the data set S, a bigger number of chunks are included in the base sample B according to an algorithm that is biased toward selecting a larger number of chunks for larger files and a smaller number of chunks for smaller files (e.g., the binomial distribution of '1' Bernouli trials with probability m/n per trial) (see Chunk Level Deduplication below).

As another example, when deduplication is performed at the file level (i.e., in a full file deduplication scenario), the elements in the data set S are not of the same length (i.e., have variable sizes because in contrast to fixed-size chunks, full file sizes vary in length), so during the sampling phase it is desirable to give a higher chance for the longer files to be represented in the sample than the shorter files. To factor in the file size, the sampling is performed so that the base sample B has more representative elements selected from the larger files than from the smaller files.

To account for the files with proportionately larger sizes in the base sample, the first counter (Base i) may be incremented more than once for an element in B, when a file that is larger than a threshold size is selected as a sample from S to be included in B. The integer value by which the count for the sample element that falls above the threshold is incremented may be calculated by way of an algorithm that is biased towards the larger file sizes (e.g., using the binomial distribution of '1' Bernouli trials with probability m/n per trial) (see Full File Deduplication below).

Accordingly, using the methodology introduced above, a better estimate for the compression and deduplication ratios across the data set S may be obtained so that larger files with proportionately larger sizes are accounted for, otherwise larger files would not be able to influence the outcome of the estimation more than the shorter files, as they should. That is, if the larger files do not account for a larger distribution across the sampling base, then the estimated average would disproportionately take into account the compression ratio and deduplication ratio of the smaller files and lead into a less accurate result.

In one embodiment, to improve the efficiency of the scanning phase in a full file deduplication scenario, certain improvements may be introduced. It is noteworthy that at the full file deduplication example, the files in the data set S are compared to the files in the base sample B. To determine if a scanned file in S (e.g., FS) is a duplicate of a sampled file in B (e.g., FB), a comparison of the hashes of the two full files or a bit by bit comparison may be employed. In one embodiment, instead of a bit by bit comparison between FS and FB, it is first determined if FS and FB have the same size. If not, then it is determined that FS is not a duplicate of FB and the count i associated with FB is not incremented.

In one example embodiment, if FS and FB are the same size, then a hash value associated with a certain portion (e.g., a small section) of FS (i.e., Hash1 FS) may be compared with a hash value associated with the same portion of FB (i.e. Hash1 FB), for example—calculating the hash value for less than the entire length of the file induces additional efficiency in the process. If Hash1 FS and Hash1 FB are not the same, then it is determined that FS and FB are not duplicates. If there is a match, however, then a more elaborate hash of the full file or a bit by bit comparison scheme may used to determine if FB and FS are duplicates. If so, the count i associated with FB is incremented to indicate that another duplicate instance of FB is present in S.

One or more detailed examples of the implementations discussed above are provided below with reference to one or more embodiments. It is noteworthy that the details provided in the examples below should not be construed to limit the scope of the claimed subject matter to the particular definitions or processes. Rather, one skilled in the art would appreciate that alternative implementations to what has been disclosed in the following details may be available to accomplish the same or similar results. The examples below are limited in nature and are not to be interpreted for the purpose of detracting from the scope of the claimed subject matter.

LIMITED EXAMPLE

The Sampling Phase: From the entire data set (S), choose m elements randomly where m is a parameter chosen in advance. For each element, calculate its hash value and add it to a set that we call the base sample (B). Merge multiple appearances of the same hash value into one entry in B where each such entry holds a counter of how many instances of this hash were in the sample. Each chosen element is taken in random from the whole data set, giving each element a probability that is proportional to its size in the data set. For each element in the base sample, indexed i ∈ B, the following data is computed and recorded: (1) $h_i$—A hash signature of the element; (2) $\rho_i$—The compression ratio of the element (in case compression is used. $\rho=1$ otherwise); (3) $base_i$—The number of appearances of an element with this hash signature in the base sample; and (4) $count_i$—set initially to zero.

The Scanning Phase: For each element e ∈ S its hash signature $h_e$ is computed. If this signature matches $h_i$ for some i ∈ B then $count_i$ is incremented by 1. If $h_e$ does not match any element in the base sample, then it is ignored. Note that there is no relevance to the specific order of the scan (in fact it can be run in parallel). In addition at this stage, no compression statistics are gathered, but rather signatures are computed. At the end of the scan, the data reduction is estimated based on the following formula (note that the length of the elements are not recorded, but come into play during the sampling phase):

$$Est = \frac{1}{m} \sum_{i \in B} \frac{base_i \cdot \rho_i}{count_i}.$$

Chunk Level Deduplication:

For the case of fixed size chunk deduplication, it is assumed that the data set S includes n chunks of equal size (for example 8 KBs each). For the sampling phase, this means that each chunk has independent probability $$\frac{m}{n}$$

to be in the base. The overall size of the data set may be computed by a standard traversal of the file system (e.g., unix du command), or extracted from existing metadata statistics on the data set (e.g., unix df command) Depending on implementation, several approaches may be used for sampling, such as those provided below by way of example.

1. Choose m random numbers in {1, . . . , n} (and test that there are no repetitions). Go over some ordering of the data set in order to find the chosen chunks. In a file system, for example, a traverse the directory tree, and the use the file sizes to figure out which files need to be read and at what offset.

2. Traverse the directory tree and make decisions on a per file basis. Let l denote the number of chunks in the file at hand. Generate a random number k according to the binomial distribution of l Bernouli trials with probability $$\frac{m}{n}$$

per trial. That is, choose $$k \sim B\left(\ell, \frac{n}{m}\right)$$

(there are standard libraries for generating such distributions). If k=0, then no chunk was chosen from the file (and the file can be ignored). If k≥1, choose k random chunks in {1, . . . , l} and add to the sample. This approach may need more random selection than the first approach and also returns m samples on average, but maybe slightly less (this can be easily remedied by using $$\frac{m'}{n}$$

with m' slightly larger than m and then choosing m of the chosen chunks at random). The benefit is that this approach does not need to store the m chosen indices at any point, and is essentially stateless and thus can be run in parallel.

After the sampling phase, the scanning phase may be implemented using the following pseudocode (Algorithm 1.1) in accordance with one example embodiment.

Algorithm 1.1: CHUNK ESTIMATE(S)

Chunk Sample(S)

Choose sample of $m$ random elements $\in S$ for each $e$ in sample do if $\exists\, i \in B\ s.t.\ h_e = h_i$ then $base_i \leftarrow base_i + 1$ else $\begin{cases} \text{add } e \text{ to } B \text{ and record:} \\ h_e \leftarrow \text{hash signature of } e \\ \rho_e \leftarrow \text{the compression ratio of } e \\ base_e \leftarrow 1 \\ count_e \leftarrow 0 \end{cases}$ Chunk Scan(S)

for each $e$ in $S$ do $\begin{cases} \text{if } \exists\, i \in B\ s.t.\ h_e = h_i \\ \text{then } count_i \leftarrow count_i + 1 \end{cases}$ Full File Deduplication In this example scenario, deduplication is done between identical files, where the metadata for all files is scanned and the actual data is read for a small fraction of the files as related to the base sample.

Sampling Files—The length of a file is taken into account, since there may be a great variance between file sizes. The total size of the data set in this example is not counted in terms of chunks, but rather in terms of a common denominator of the lengths in which files are stored. This may either be the page size of the file system (if files are stored as a collection of full pages), or in the most general case in terms of single bytes. N denotes the total number of bytes in the data set.

In one embodiment, each byte has independent probability $$\frac{m}{N}$$

to be chosen, and for each chosen byte the owning file (or chunk) is included in the base sample. Note that the same file might be chosen more than once for the base sample, and this duplication should be recorded. The actual sampling follows closely the two options raised for chunks as described above. In option 1, m offsets are chosen in $\{1, \ldots, N\}$ and a file is chosen to be part of the base sample if it contains a chosen offset. If it contains more than one offset then the base counter of this file reflects this. In option 2, the base counter is the result of the corresponding binomial random variable (where 0 means it is not in the sample).

Scan phase optimizations—In the case of full files, metadata that is readily available in a typical file system may be utilized to reduce the need to read all data from disk in the scan phase. That is, in this example, processing may be limited to files that are relevant to the base sample (i.e., where the files respective hash is in the base sample). Thus, the file length, for example, may be used to rule out the possibility that a file is relevant, since a file can only be there if a file with the same length is ready in the bases sample. This serves as a type of Bloom filter that look at the data if the data has a chance of being relevant.

In one embodiment, a second filter is a hash on the first block of the file. This may be as short as a single page of the file system. In some file systems, the first block resides in the i-node of the file and thus may be read quickly during a metadata scan without the addition of extra disk seeks. Files that have both length and first hash matching an entry in the base sample may be read from disk. Formally, the following information may be added into the base sample, for each file in the base sample, indexed $i \in B$:

$l_i$—The length of the file.

$h1_i$—A hash signature on the first block of the file.

Referring to the process during the scan phase, for each element (file) e in the data set, the following is performed:

1. If the length of the file e matches $l_i$ for some $i \in B$ continue. Otherwise ignore the file e.
2. Compute the hash on the first block of e to get $h1_e$. If there exists $i \in B$ such that $l_e = l_i$ and $h1_e = h1_i$ then continue. Otherwise ignore the file e.
3. Compute the full hash on the file e to get $h_e$. If there exists $i \in B$ such that and $h_e = h_i$ then continue do $count_i = count_i + 1$. Otherwise ignore the file e.

The ratio at the end of the process may be computed as provided earlier by way of the following formula:

$$Est = \frac{1}{m} \sum_{i \in B} \frac{base_i \cdot \rho_i}{count_i}$$

It is noteworthy that the length of the files may be ignored in the computation of the ratio (although it is recorded) in accordance with one or more of the disclosed example embodiments. The rational is that a long file will be more likely to appear in the base sample than a short one (and in extreme cases will even appear twice or more), and thus we don't need to give additional bias in favor of longer files. The full algorithm's pseudocode is detailed in Algorithm 1.2 below:

Algorithm 1.2: FULL-FILE ESTIMATE(S)

Chunk Sample(S)

for each file $e \in S$ do $k \xleftarrow{s} B\!\left(\ell_e, \dfrac{m}{n}\right)$ then if $\exists\, i \in B\ s.t.\ h_e = h_i$ then $base_i \leftarrow base_i + k$ else $\begin{cases} \text{add } e \text{ to } B \text{ and record:} \\ h_e \leftarrow \text{hash signature of } e \\ \rho_e \leftarrow \text{the compression ratio of } e \\ \ell_e \leftarrow \text{length of } e \\ h1_e \leftarrow \text{hash of the first block of } e \\ base_e \leftarrow 1 \\ count_e \leftarrow 0 \end{cases}$ Full File Scan(S)

for each $e$ in $S$

-continued $$do \begin{cases} \text{if } \exists i \in B \text{ s.t.} \ell_e = \ell_i \\ \text{then} \begin{cases} \text{compute } h1_e \\ \text{if } \exists i \in B \text{ s.t.} \ell_e = \ell_i \text{ and} \\ h1_e = h1_i \\ \text{then} \begin{cases} \text{compute } h_e \\ \text{if } \exists i \in B \text{ s.t.} \ell_e = \ell_i \text{ and} \\ h1_e = h1_i \text{ and } h_e = h_i \\ \text{then count}_i = \text{count}_i + 1 \end{cases} \end{cases} \end{cases}$$

Variable sized chunking—Variable sized chunking poses a challenge, since one can neither figure out how many chunks are in a file nor at what offset the $j^{th}$ chunk might be, without reading and chunking the entire file. Instead, the sampling process may be implemented to choose exact offsets in the files, and then choose the chunk which contains this offset. For example, assume that an offset k was chosen in a file, and implemented by reading the file at an offset k−max$_{chunk}$ and chunking from there until the chunk containing the relevant offset is found. This implementation both relieves the need to read entire files and achieves the desired result of giving each chunk a probability that is linear to the chunk's actual length.

Maintaining the Base Sample

Different methods may be used to hold the base sample during the scan phase. The most economic in terms of memory space is by sorting the base sample according to the hash value at the end of the sample phase. Since no insertions are needed during the scan phase, then updating the counters in the base sample entails lookups that can be performed by searching over a sorted array (at the cost of log m lookups in the RAM table). The memory overhead is as small as m times the size required for holding the hash signature and counter (e.g., 24 bytes).

An alternative is to use more sophisticated hash based structures that can work with good memory utilization such as cuckoo hashing or open addressing, for example. Such structures may gain faster average lookup times (i.e., constant number per lookup), but may require more memory due to performance deterioration as the memory becomes full. It is noteworthy that in one example embodiment, lookups are performed in the scan phase, rather than insertions and deletions of items to the base sample, to alleviate the run time of the scan of the heaviest operations associated with maintaining data structures for fast lookup.

Parallel Execution:

In one embodiment, the scan phase may run in parallel on a distributed system. The base sample may be circulated to the scanning nodes, and a node may do the scan locally and accumulate the count for the data adjacent to its node. At the end of the process, the counts are accumulated centrally and the data reduction ratio is calculated. This approach fits in the Map Reduce framework for parallel computing. It is noteworthy that holding the entire base sample at each node may not be avoided, so a process running on k nodes in parallel may rely on holding k simultaneous copies of the base sample.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
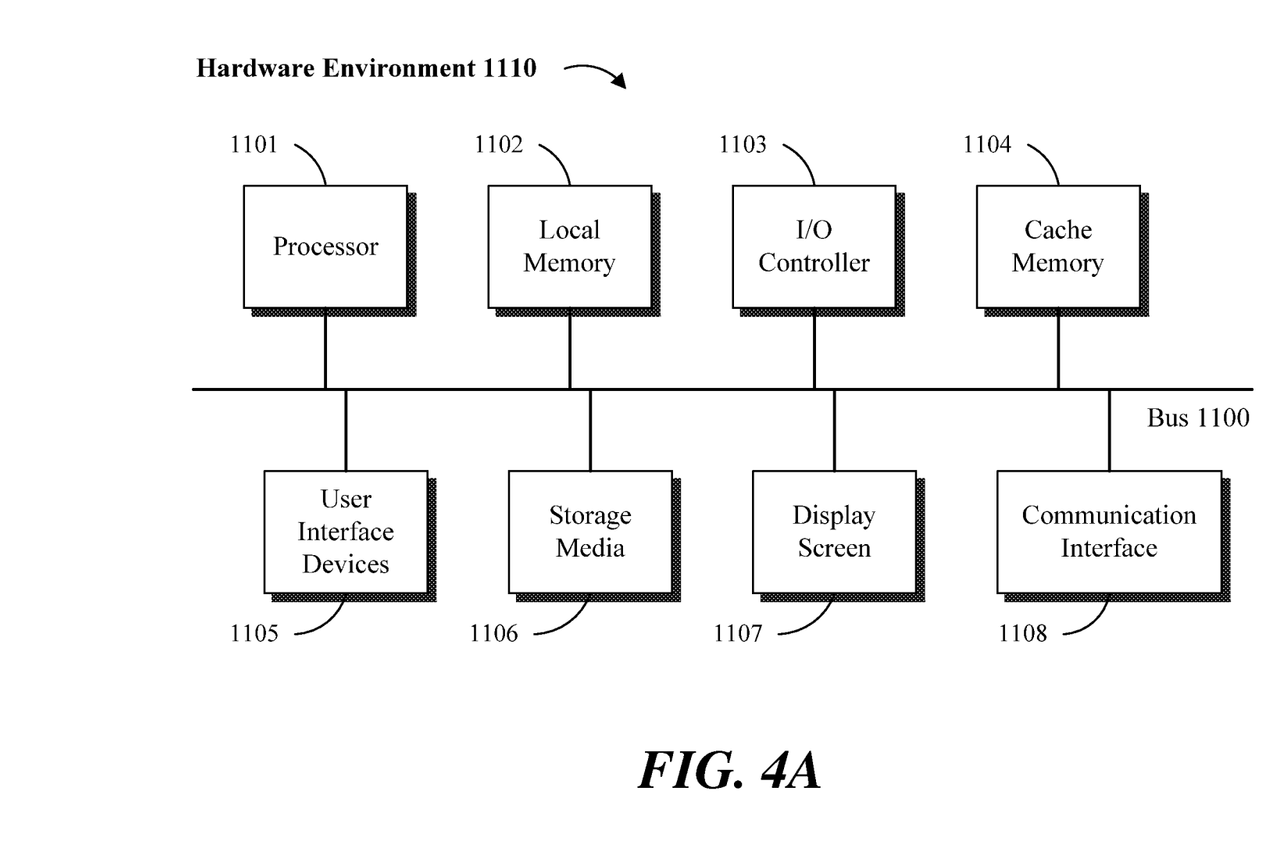
FIGS. 4A and 4B are block diagrams of hardware and software environment that may be used to support or implement the subject matter claimed in accordance with one embodiment.
Figure 4B:
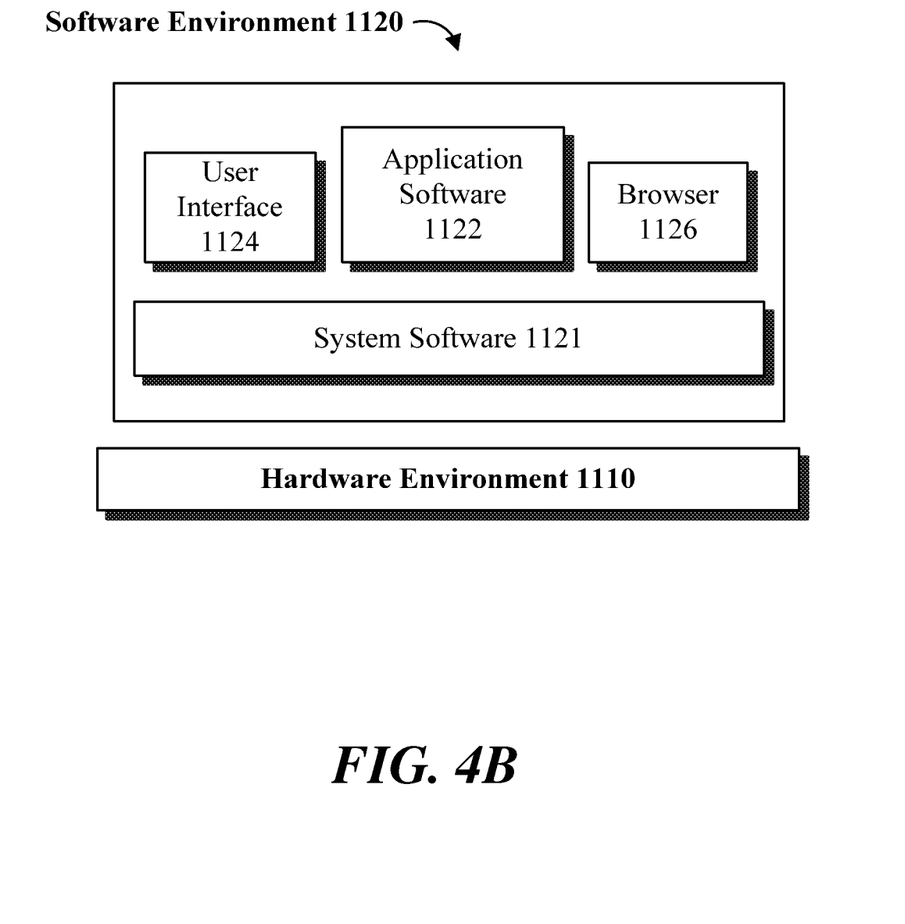

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-RAY), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method for estimating data reduction ratio for a data set, the method comprising:
    selecting a plurality of m elements from a data set comprising a plurality of N elements;
    associating an identifier $h_i$ for each of the plurality of m elements, where i is an integer between A and B, wherein B−A=m−1;
    associating an identifier $h_e$ for each of the plurality of elements in the data set, where e is an integer between C and D, wherein D−C=N−1;
    tracking number of times an element i appears in a base set that includes the plurality of m elements selected from the data set;
    calculating a value $count_i$ that indicates the number of times an identifier $h_e$ matches an identifier $h_i$; and
    estimating data reduction ratio for the plurality of N elements in the data set, based on number of m number elements selected from the data set and the value $count_i$, wherein the selected plurality of m elements in the data set is stored in a base sample B;
    estimating of the data reduction ratio according to formula:

$$Est = \frac{1}{m} \sum_{i \in B} \frac{base_i \cdot \rho_i}{count_i},$$

wherein $\rho_i$ defines a corresponding compression ratio for one or more of the selected plurality of m elements of the data set, and
    wherein the calculating and estimating are performed by one or more processors.

2. The method of claim 1, wherein the tracking number of times an element i appears in the base set comprises calculating a value $base_i$ that indicates number of times an element i appears in a base set that includes the plurality of m.

3. The method of claim 1, wherein the value $base_i$ is generated by incrementing the first value $base_i$ each time an identifier $h_i$ is the same as an identifier $h_e$.

4. The method of claim 1, wherein each identifier $h_i$ is generated based on a hash algorithm applied to a value associated with a respective one of the plurality of m elements.

5. The method of claim 1, wherein $\rho_i=1$.

6. The method of claim 1, wherein each of the selected plurality of elements is a chunk.

7. The method of claim 1, wherein each of the selected plurality of elements is a full file, and wherein a first attempt in determining whether a scanned file in the data set is not the same as a file in the base set is based on size of the scanned file, a hash value of a first portion of the scanned file as compared to that of a target file in the base set or other data useful to identify differences between the scanned file and the target file.

8. A method for estimating data reduction ratio for a data set, the method comprising:
    selecting a plurality of m elements from a data set comprising a plurality of N elements;
    associating a first identifier for one or more of the plurality of m elements;
    associating a second identifier for one or more of the plurality of elements in the data set;
    tracking number of times an element i appears in a base set that includes the plurality of m elements selected from the data set;

calculating a value count$_i$ that indicates the number of times the identifier matches the first identifier for an element i; and estimating data reduction ratio for the plurality of N elements in the data set, based on number of m number elements selected from the data set and the value count$_i$, wherein the selected plurality of m elements in the data set is stored in a base sample B;

estimating of the data reduction ratio according to formula:

$$Est = \frac{1}{m} \sum_{i \in B} \frac{\text{base}_i \cdot \rho_i}{\text{count}_i},$$

wherein $\rho_i$ defines a corresponding compression ratio for one or more of the selected plurality of m elements of the data set, and wherein the calculating and the estimating are performed by one or more processors.

9. The method of claim 8, wherein the tracking number of times an element i appears in the base set comprises calculating a value base$_i$ that indicates number of times an element i appears in a base set that includes the plurality of m.

10. The method of claim 8, wherein the value base$_i$ is generated by incrementing the first value base$_i$ each time the second identifier for an element i is the same as the first identifier.

11. The method of claim 8, wherein the first identifier for an element i is generated based on a hash algorithm applied to a value associated with the element i.

12. A system for estimating data reduction ratio for a data set, the system comprising:
  one or more processor in communication with a memory;
  a logic unit for selecting a plurality of m elements from a data set comprising a plurality of N elements;
  a logic unit for associating a first identifier for one or more of the plurality of m elements;
  a logic unit for associating an second identifier for one or more of the plurality of elements in the data set;
  a logic unit for tracking number of times an element i appears in a base set that includes the plurality of m elements selected from the data set;
  a logic unit for calculating a value count$_i$ that indicates the number of times the identifier matches the first identifier for an element i; and
  a logic unit for estimating data reduction ratio for the plurality of N elements in the data set, based on number of m number elements selected from the data set and the value count$_i$,
    wherein the selected plurality of m elements in the data set is stored in a base sample B;
  a logic unit for estimating of the data reduction ratio according to formula:

$$Est = \frac{1}{m} \sum_{i \in B} \frac{\text{base}_i \cdot \rho_i}{\text{count}_i},$$

wherein $\rho_i$ defines a corresponding compression ratio for one or more of the selected plurality of m elements of the data set.

13. The system of claim 12, wherein the tracking number of times an element i appears in the base set comprises calculating a value base$_i$ that indicates number of times an element i appears in a base set that includes the plurality of m.

14. The system of claim 12, wherein the value base$_i$ is generated by incrementing the first value base$_i$ each time an identifier h$_i$ is the same as an identifier h$_e$.

15. A computer program product comprising logic code embedded in a data storage medium, wherein execution of the logic code on a computer causes the computer to:
  select a plurality of m elements from a data set comprising a plurality of N elements;
  associate an identifier h$_i$ for each of the plurality of m elements;
  associate an identifier h$_e$ for each of the plurality of elements in the data set;
  track number of times an element i appears in a base set that includes the plurality of m elements selected from the data set;
  calculate a value count$_i$ that indicates the number of times an identifier h$_e$ matches an identifier h$_i$; and
  estimate data reduction ratio for the plurality of N elements in the data set, based on number of m number elements selected from the data set and the value count$_i$,
    wherein the selected plurality of m elements in the data set is stored in a base sample B;
  estimate the data reduction ratio according to formula:

$$Est = \frac{1}{m} \sum_{i \in B} \frac{\text{base}_i \cdot \rho_i}{\text{count}_i},$$

wherein $\rho_i$ defines a corresponding compression ratio for one or more of the selected plurality of m elements of the data set.

16. The computer program product of claim 15, wherein the tracking number of times an element i appears in the base set comprises calculating a value base$_i$ that indicates number of times an element i appears in a base set that includes the plurality of m.

17. The computer program product of claim 15, wherein the value base$_i$ is generated by incrementing the first value base$_i$ each time an identifier h$_i$ is the same as an identifier h$_e$ and each identifier h$_i$ is generated based on a hash algorithm applied to a value associated with a respective one of the plurality of m elements.

* * * * *